March 29, 1966 C. P. E. CHENOWETH 3,243,705
PLURAL INPUT MEASURING SYSTEM USING ELECTRONIC CIRCUIT
ARRANGEMENTS HAVING PLURAL SELECTIVELY ENERGIZED
TRANSFORMER TYPE SAMPLING MEANS
Filed July 6, 1961 2 Sheets-Sheet 1

INVENTOR
Charles Philip Ernest Chenoweth
BY
ATTORNEY

March 29, 1966  C. P. E. CHENOWETH  3,243,705
PLURAL INPUT MEASURING SYSTEM USING ELECTRONIC CIRCUIT
ARRANGEMENTS HAVING PLURAL SELECTIVELY ENERGIZED
TRANSFORMER TYPE SAMPLING MEANS
Filed July 6, 1961  2 Sheets-Sheet 2

INVENTOR
Charles Philip Ernest Chenoweth
BY
ATTORNEY

United States Patent Office 3,243,705
Patented Mar. 29, 1966

3,243,705
PLURAL INPUT MEASURING SYSTEM USING ELECTRONIC CIRCUIT ARRANGEMENTS HAVING PLURAL SELECTIVELY ENERGIZED TRANSFORMER TYPE SAMPLING MEANS
Charles Philip Ernest Chenoweth, Elwood, Melbourne, Victoria, Australia, assignor to Associated Electrical Industries Limited, London, England, a British company
Filed July 6, 1961, Ser. No. 122,192
Claims priority, application Great Britain, July 26, 1960, 26,010/60
7 Claims. (Cl. 324—127)

This invention relates to electronic apparatus for sampling a number of different electrical circuits.

The invention has an important application in process control in which information from a number of different points has to be sampled recurrently and the information fed to a central control point where it may, in many cases, provide the input for computing apparatus.

In equipment in which there are only a few sampling points the selection may be carried out by mechanical switching. However, where there are a large number, e.g. hundreds of sampling points it is cumbersome and almost impracticable to use mechanical switching and furthermore, the time period available for inspecting each quantity to be sampled becomes very short, i.e. of the order of micro-seconds, which makes it difficult, if not impossible, to select the lines in sequence fast enough.

The main object of the invention is to provide an improved arrangement suitable for operation under such conditions.

According to the present invention each circuit to be sampled is connected through a rectifier to the primary of a high inductance transformer at a central control point with a bypass circuit across the primary and rectifier, there being a separate transformer for each circuit through which current to be sampled normally flows with a negligible flow through the bypass circuit, together with means for applying an interrogating voltage across each transformer secondary winding in turn in such a direction that the E.M.F. induced in the primary winding cuts off the current through the primary winding and diverts the primary current into the bypass circuit thereby causing a current flow through the secondary winding which is a function of the interrupted primary current which before interruption flowed through the primary circuit and means responsive to the magnitude of said secondary current.

The magnitude of the current to be sampled may represent an analogue quantity in which case the magnitude of the interrogating current will be a function of the sampled current and measuring apparatus may be provided which is common to all the transformer secondaries and measures each current in turn.

In some cases the measuring apparatus may include an analogue digital converter so that the information may be fed to computing apparatus in digital form.

In other cases the interrogating apparatus may merely actuate a control device under certain conditions, e.g. if the current exceeds a predetermined value.

In order that the invention may be more clearly understood reference will now be made to the accompanying drawings, in which.

Figure 1:
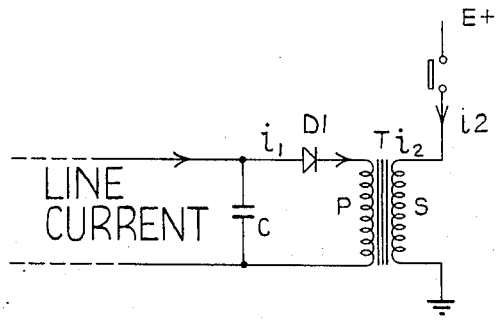
FIG. 1 is an explanatory figure showing the basic features of an interrogating circuit for one line.

Referring to FIG. 1 the reference T indicates the transformer which has a primary P and a secondary S. C is a condenser which constitutes the bypass circuit.

It is assumed that the line current is of constant direction and the polarity of the diode D is such as to allow the line current to flow through the transformer primary, the secondary winding S being normally open circuited. Under such conditions the transformer will carry a substantially steady flux, and the transformer should have a high permeability (i.e. a soft iron core) and a high inductance. It should be noted that "square loop" cores are unsuitable.

If now a voltage pulse is applied across the secondary winding in such a direction that the resultant current flow $i_2$ tends to reinforce the flux, then a back E.M.F. will be developed in the primary winding P which will cut off the current flow. Since this cutting off the current will happen in a very short space of time and in much less time than the dying out of the flux in the transformer, it follows that the secondary current $i_2$ will increase instantaneously to maintain the transformer total ampere turns constant and the value of $i_2$, after it has increased, will be a function (depending almost solely on the turns ratio) of the primary current $i_1$ prior to its interruption; this increased secondary current $i_2$ will remain substantially constant (i.e., the magnetising current will be negligible) for sufficiently long to permit of its being measured, provided the inductance of the secondary winding S is high having regard to the applied secondary volts. When the current $i_1$ is cut off it will be diverted into the bypass circuit provided by the condenser C and provided the cut off time is of a short duration and the sampled current sufficiently large so that the sampled line current will not be noticeably disturbed.

Whilst in the arrangement shown the bypass circuit has been provided by the condenser C, it may be provided alternatively by a transistor or a second diode provided that the characteristics are so chosen or the bypass circuit so arranged that under quiescent conditions substantially all the current flows through D1 and the primary winding and that the current flowing through the bypass circuit is negligible.

In the operation of the circuit just described, it should be appreciated that the measurements are made under what are really transient conditions and not under steady conditions. The diode D1 can be regarded as a switching device; the windings are so arranged that an increase in the secondary current $i_2$ will induce an E.M.F. in the primary winding which is in such a direction as to cut off the diode D1, in other words to open the switch; this will isolate the primary winding P from the line current and will by-pass the circuit through capacitor C so that the primary winding immediately becomes open circuited.

If, for argumentative purposes only, at the moment when the switch in the secondary circuit is closed there is no line current flowing, then the primary winding would have no effect and the secondary winding would act as a choke and offer a high impedance to the secondary current.

If however, as is the case, the primary winding P is carrying current, then, as above explained, closure of the secondary switch will allow secondary current to flow which will induce an E.M.F. in the primary which will cut off diode D1. Immediately this happens the primary winding P will be isolated, but it will be remembered that the primary winding P is carrying current which immediately falls to zero, but the flux, due to the interrupted primary current, cannot decay at the same rate as the current and consequently $i_2$ increases instantaneously to maintain the ampere turns. The increase in $i_2$ will be a measure of the drop in the primary current. In the case of a 1:1 transformer, $i_2$ will be a direct measure of the line current.

Another way of looking at the changes which occur is to regard the fall in primary current as generating a forward E.M.F. in the secondary which causes the increase in secondary current.

It is, however, to be remembered that the increase in secondary current is of a transient nature, but lasts long enough to permit of the current being measured.

However, it is most important to be remembered that since the primary winding is denied to the line current an alternative path must be provided for the line current, since it is this current which is being interrogated and the interrogation must be carried out without upsetting the conditions in the lines. This difficulty is overcome by providing a by-pass circuit for the line which is operative immediately the diode concerned is cut off; in FIG. 1 the by-pass circuit is provided by the capacitor C.

It must be appreciated that this by-pass circuit is essential since the cut off of D1 occurs very rapidly so that some provision must be made for the line current, in very many cases it is most undesirable to upset the circuit under interrogation and the by-pass circuit avoids such interference.

Figure 2:
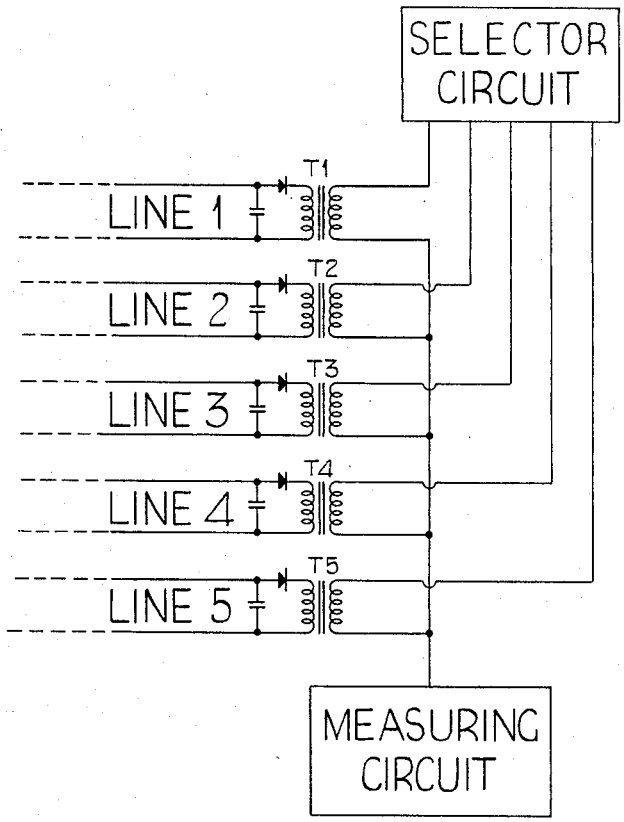
FIG. 2 shows how a number of circuits of the kind shown in FIG. 1 may be connected in turn to measuring apparatus.

FIG. 2 shows how a number of transformers may be operated in turn for the purpose of sampling a number of different lines. For simplification only five lines are shown but in actual practice there may be a large number of lines, i.e. hundreds. By means of the selector circuit a voltage pulse is applied across each secondary winding in turn whilst the secondary windings are all commoned and connected to the same measuring apparatus so that the current in each line will be measured in turn.

Figure 3:
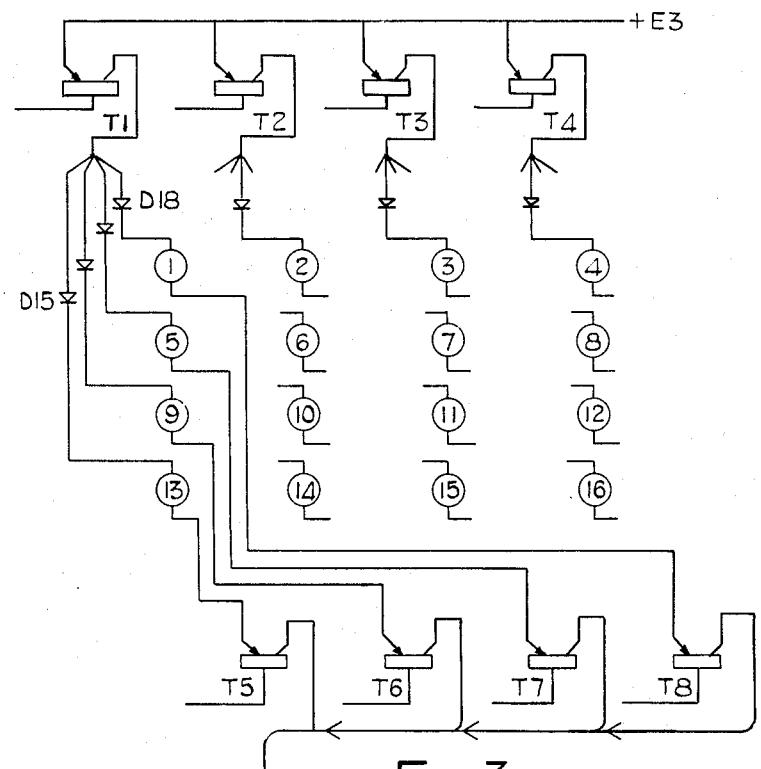
FIG. 3 shows one form of selector switch.

FIG. 3 shows one way of selecting the transformers. In the actual arrangement shown there are 16 transformers of which the secondaries are indicated by circles numbered 1, 2 . . . 16. Selection is effected by two banks of transistors T1–T4 and T5–T8. Each of the transformers is connected between a transistor of the first bank and a transistor of the second. Thus, by actuating the appropriate transistor of each bank any transformer may be selected. For example, energising transistors T1 and T8 will operate the transformer 1 and similarly transistors T1 and T7 operate transformer 5.

Whilst this is a suitable method of selector switching clearly other methods may be employed.

Figure 4:
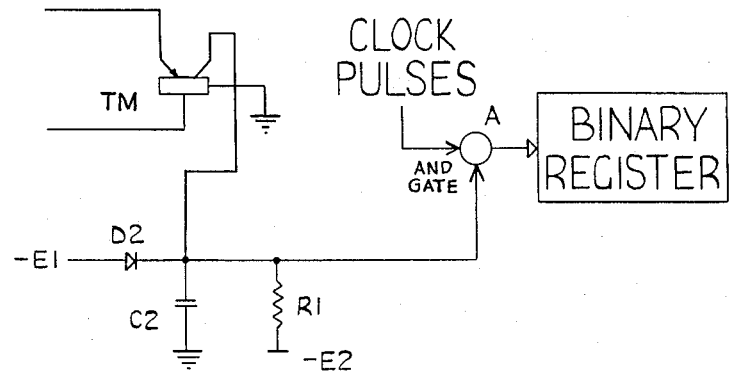
FIG. 4 shows one form of measuring apparatus. It will be appreciated that the apparatus of FIG. 3 is connected to that of FIG. 4 through the line shown dotted.

FIG. 4 shows an analogue digital converter which comprises a transistor TM and a condenser C2. The voltage sources E1 and E2 may, for example, be −16 volts and −100 volts. Normally the upper plate of the condenser will be at −E1 potential.

If now the secondary current to be measured is applied to the emitter of the transistor TM for a constant accurate time period, say $t'$ this will charge C2 and cause the potential at the upper plate of C2 to rise above E1, cutting off D2. This potential will be applied to the lower input terminal of the AND gate A. When the secondary current is switched off at the end of time $t'$ the clock is turned on and clock pulses are counted by the binary register.

When eventually the condenser has discharged to −E1 once more, the AND gate will close so that no more clock pulses will be passed to the binary register and the number of clock pulses counted will be a digital measurement of the amplitude of the pulse sampled.

Whilst in the arrangement above described the current to be sampled is an analogue quantity which is sampled quantitatively, it follows that it may be a binary quantity, i.e., the sampling may merely determine whether or not there is primary current flowing, or more significantly whether it is above a threshold value.

A number of transformers may be arranged in this manner to provide a signal in binary coded form.

What I claim is:

1. An electronic apparatus for sampling an electrical D.C. current carrying circuit comprising a high inductance transformer having a high permeability core and having primary and secondary windings, connections between said electrical circuit and the primary winding of said transformer, a rectifier poled to pass the D.C. current in series with each primary winding, a by-pass circuit for said primary circuit so arranged that under quiescent conditions substantially all the current in said primary circuit flows through the rectifier and the primary winding and so that the current flowing through the by-pass circuit is negligible, said by-pass circuit being connected across said primary winding and rectifier, means for applying an interrogating D.C. pulse voltage across the secondary winding in a direction to tend to increase the existing flux in the transformer and such that a back E.M.F. is induced in the primary winding to back bias and cut off the rectifier and interrupt the current flow through the primary of the transformer, and thereby to divert the primary current through the by-pass circuit, and means for measuring the resultant current flow through the secondary winding to provide a measurement proportional to the interrupted primary current.

2. An electronic apparatus for sampling a plurality of electrical D.C. current carrying circuits comprising a high inductance transformer having a high permeability core for each circuit and each having primary and secondary windings, connections between each said electrical circuit and the primary winding of each associated transformer, a rectifier poled to pass the D.C. current in series with each said primary winding, a by-pass circuit for each said primary circuit so arranged that under quiescent conditions substantially all the current in said primary circuit flows through the rectifier and the primary winding and so that the current flowing through the by-pass circuit is negligible, each said by-pass circuit being connected across said primary winding and rectifier, means for applying an interrogating D.C. pulse voltage across each secondary winding, in turn, in a direction to tend to increase the existing flux in the transformer and such that a back E.M.F. is induced in the primary winding to back bias and cut off the rectifier and interrupt the current flow through the primary of the transformer, and thereby to divert the primary current through the by-pass circuit, and means for measuring the resultant current flow through the secondary winding to provide a measurement proportional to the interrupted primary current.

3. An electronic apparatus as set forth in claim 1 in which the by-pass circuit is provided by a capacitor being shunted across the line and in parallel with the series connected rectifier and transformer primary.

4. An electronic apparatus as set forth in claim 2 in which all of said transformers are located at a central control point.

5. An electronic apparatus as set forth in claim 4 in which the means for measuring the current flow through the secondaries of the transformers is common to all of said secondary windings.

6. An electronic apparatus as set forth in claim 5 in which said measuring means comprises an analogue digital converter.

7. An electronic apparatus as set forth in claim 2 in which said measuring means includes pulsing control apparatus to determine the time for measuring the said resultant current flow.

References Cited by the Examiner

UNITED STATES PATENTS

| | | | |
|---|---|---|---|
| 1,825,514 | 9/1931 | Fitzgerald | 324—127 |
| 2,832,049 | 4/1958 | Cham | 324—117 |
| 2,832,062 | 4/1958 | Tracy | 307—88 |
| 2,972,060 | 2/1961 | Torrey | 307—88.5 |
| 3,062,967 | 11/1962 | Popowsky | 324—104 |

WALTER L. CARLSON, *Primary Examiner.*

FREDERICK M. STRADER, *Examiner.*

R. V. ROLINEC, *Assistant Examiner.*